May 20, 1958
T. J. McGUFF ET AL
2,835,340
MOISTURE SEPARATOR
Filed Feb. 17, 1955
2 Sheets-Sheet 1
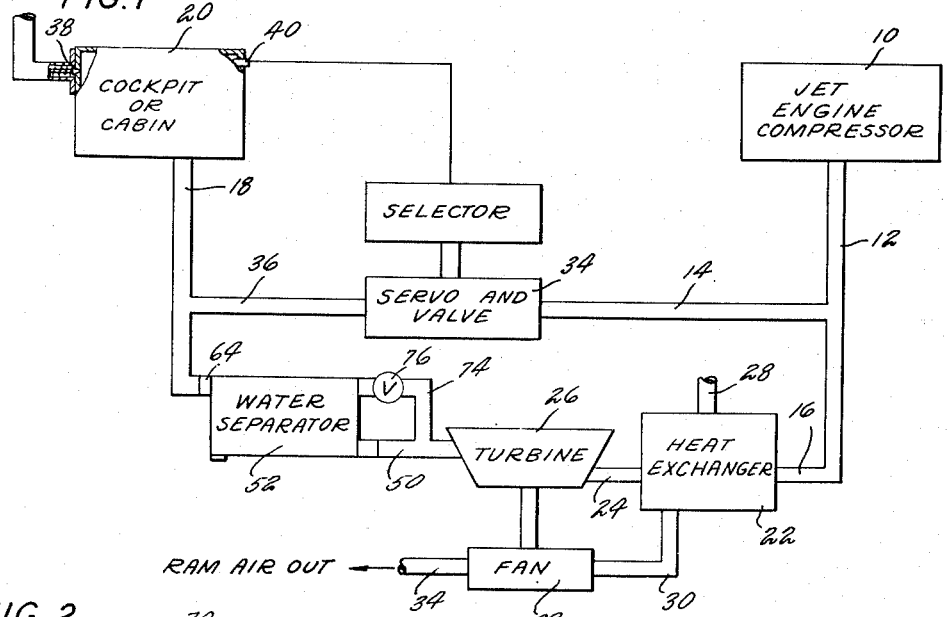
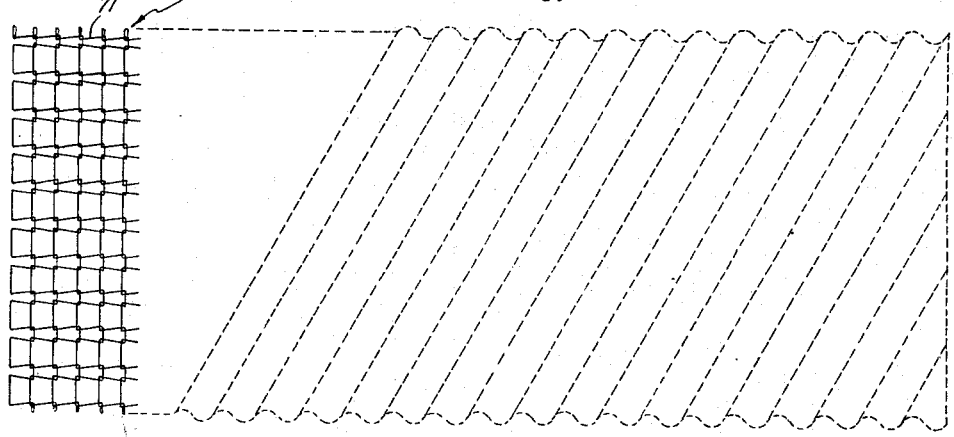
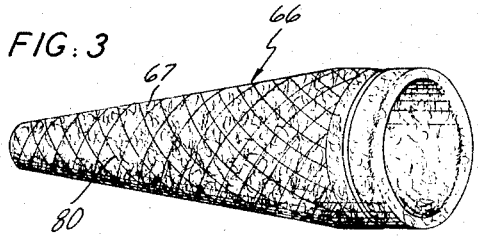
INVENTORS
THOMAS J. McGUFF
ALBRECHT E. REINHARDT
BY *Harris & Luther*
ATTORNEY

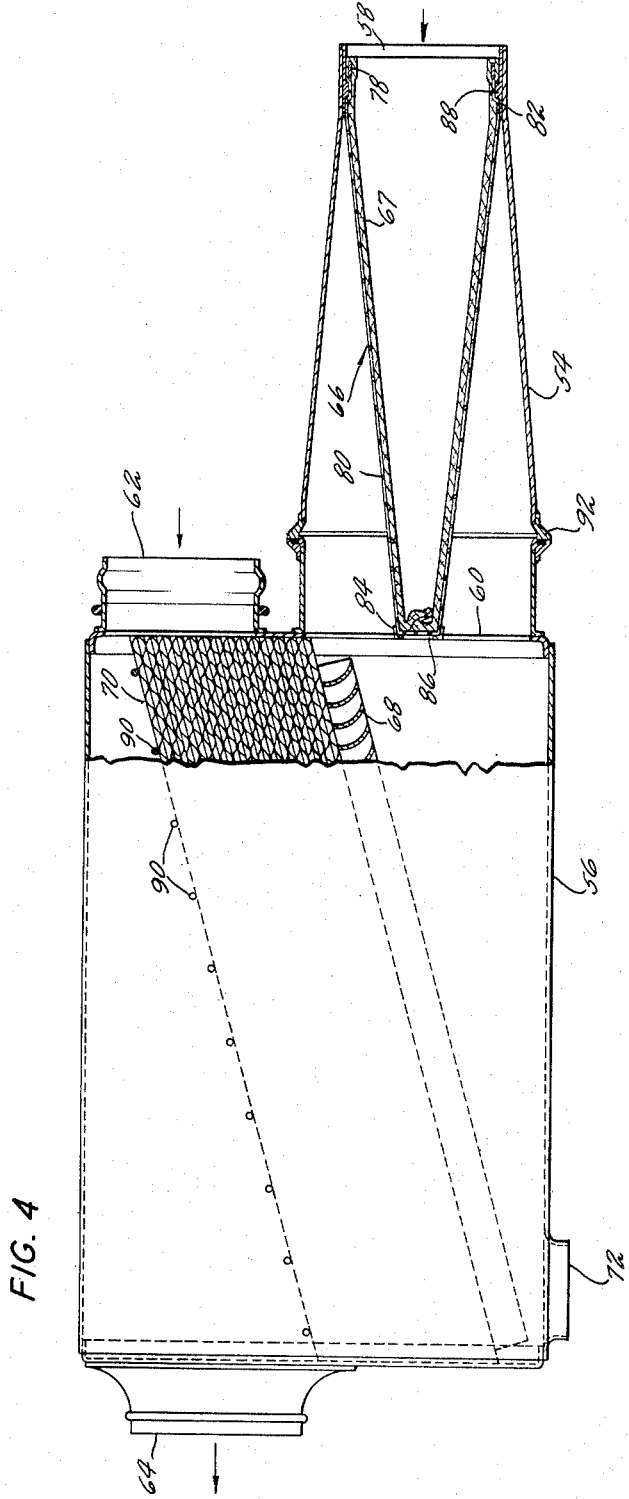

United States Patent Office 2,835,340
Patented May 20, 1958

2,835,340

MOISTURE SEPARATOR

Thomas J. McGuff, Warehouse Point, and Albrecht E. Reinhardt, West Hartford, Conn., assignors to United Aircraft Corporation, East Hartford, Conn., a corporation of Delaware Application February 17, 1955, Serial No. 488,822

6 Claims. (Cl. 183—65)

This invention relates to a liquid separation mechanism and particularly to a water separator for use in an airplane air conditioning system.

An object of this invention is a device which will efficiently separate entrained moisture from cooled air being fed to an airplane compartment.

A further object is mechanism, requiring no moving parts, which will collect moisture and form it into drops large enough to fall into a receiving basin from which the collected moisture may be drained.

A still further object is a device combining a cloth coalescer transforming vapor from a moving air stream into small drops and a collector forming the small drops from the moving air stream into larger ones which may be assembled and drained before they are carried on by the air stream.

Other and additional objects will be apparent from the following specification and the attached drawings in which:

Fig. 1 is a schematic drawing showing the general arrangement of an airplane air conditioning system.

Fig. 2 is an enlarged plan view with a portion thereof schematic showing the wire mesh collector and its corrugations.

Fig. 3 is a perspective view of the napped nylon coalescer.

Fig. 4 is a side elevation partly in section of the assembled water separator.

The design of an air conditioning system for the present-day aircraft entails the consideration of several factors which vary with changes in flight operation and which dictate the requirements of the system. For example, during ground operation and at low level flight the system may be required to deliver a cooling air stream to the aircraft cabin or cockpit to provide comfortable conditions for the occupants thereof. At moderate altitudes the system may be required to deliver a warm air stream and during high-altitude, high-speed operation the system will probably be called upon for a cold air supply.

In the past, various systems have been developed to utilize a compressed air source, such as a bleed from the compressor of a turbine, and to supply air at the various temperatures required for cabin comfort. In such systems some of the hot compressed air is cooled by conventional means to provide cold air cabin supply and some of the hot compressed air is utilized to supply a hot air supply. The hot and cold air supply are mixed in varying proportions and led to the cabin or cockpit to obtain the desired cabin air temperature.

The systems may also be adapted in accordance with conventional practices to maintain a selected cabin pressure. Since the present invention relates primarily to improvements in the air temperature control system, pressure control will be only briefly referred to.

The present invention may be briefly described as embracing improvements in the control of the water content of air being delivered to an airplane compartment. It has been found that under some conditions air fed to an airplane compartment contains sufficient moisture to cause fog, rain, or snow in the airplane compartment. In order to eliminate this result, a water separator is inserted into the cold air discharge from the cooling turbine to remove the moisture from the cooled air, thus reducing the moisture content of the mixed air fed to the cabin to such an extent that the dew point will be below the cabin temperature. Because the ability of air to hold moisture is proportional to temperature of the air, air at turbine discharge temperature which is considerably lower than ambient temperature is, for at least some operating conditions, in a state of super-saturation. By removing the free moisture from this cooled air, although its relative humidity will not be reduced to below 100%, the mixture of this cold air and the warm air fed to the compartment will, because the temperature of the mixture is higher than the cold air, have a relative humidity below 100% and fogging will thus be prevented.

Referring to the drawings, the specific embodiment chosen to illustrate the invention for purposes of explanation, but not limitation, comprises a source of compressed air which may be the compressor 10 of a jet or turbine engine. Hot air from compressor 10 is led through line 12 and through two parallel lines 14 and 16 to the cabin inlet conduit 18. Air which is discharged from the compressor 10 to the conduit 16 is cooled to provide the previously mentioned cold air supply for the compartment 20 and the air which is discharged to the conduit 14 by-passes the cooling system and provides the hot air supply for the cabin which is mixed with the cold air supply to provide a supply of selected temperature.

With specific reference to the cold air supply, it will be noted that air in conduit 16 is passed through a heat exchanger 22 to give up a major portion of its heat and is then passed through conduit 24 to drive a turbine 26 which will remove energy from the air stream air and, in so doing, further reduce the air temperature. The cooled air is fed from the turbine 26 to the conduit 50 and through a water separator 52 to the cabin inlet conduit 18. The cooling air for the heat exchanger is introduced through a line 28 which may be supplied with ram air. After passing through the heat exchanger 22, the cooling air is led through conduit 30 and a fan 32 driven by the turbine 26, and is then discharged overboard through a conduit 34. The fan 32 provides a load for the turbine 26, permitting the turbine to extract energy from the air passing through it.

The hot air supply fed through by-pass 14 is controlled by a valve 34 and is then led through a conduit 36 to the cabin air inlet conduit 18. The hot air supply from the conduit 36 and the cold air supply from the water separator 52 are mixed in the cabin air inlet conduit 18 before introduction to the cabin. The proportion of the mixture is controlled by valve mechanism 34 which is automatically operable in response to temperature responsive means 40 in the cabin 20.

The system has been described without consideration of the pressure requirements for various altitudes and varying conditions of flight operations. For purposes of simplicity, it may be assumed that the system will deliver air to the cabin under pressure sufficient for all flight conditions and a pressure responsive cabin ventilator or relief valve 38 is arranged to maintain cabin pressure at a desired or selected level. As this application is directed primarily to the water separator, it is believed unnecessary to supply further details of the cabin air supply. Reference may be made however to application Serial No. 471,152 of Sims and Farkas for Cabin Temperature Control System for further details of the system.

The water separator comprises a tubular casing 54 connecting conduit 50 with the main casing 56. Tubular casing 54 has an inlet 58 discharging at 60 into casing 56.

Casing 56 forms a chamber having an inlet 62 in addition to the inlet formed by the discharge of circular casing 54 and has an outlet 64. Casing 54 encloses a coalescer 66 and casing 56 encloses turning vanes 68 and a collector 70.

Air fed into the inlet 58 passes through coalescer 66 where the vapor and entrained water is gathered into small drops. These small dops will either fall by gravity to the bottom of the casing 56 or will be carried along in the air stream and turned from a horizontal to a vertical direction by the turning vanes 68. The air with the small droplets therein is then fed vertically through the collector 70 which will act to collect the small droplets into larger drops which will either drop by gravity from the collector to the bottom of casing 56 or will follow along the wires of the collector fabric until they either drop from the collector or reach the side walls of the casing 56 and under the influence of gravity run down the sides of the casings. The extracted water collected in the bottom of casing 56 is drained through drain 72 to a convenient receptacle or overboard.

The air, after the water has been extracted therefrom, passes through the collector 70 and into the outlet 64 to the cabin inlet conduit 18 where it is mixed with warmer air from the conduit 36.

Under certain conditions, such as high altitude operation, it may be desirable to by-pass the water separator and for that purpose a conduit 74 and valve 76 which may be actuated by ambient pressure are provided, by means of which air may be fed directly from the turbine to the inlet 62 around and through a small portion of a collector 70 to the outlet 64. As this by-pass does not form a part of the present invention, it is believed that no further description is necessary.

The coalescer 66 comprises a napped nylon cloth in the form of a hollow cone with the hollow base of the cone facing upstream. A napped nylon fabric 67 is secured to a ring 78 to form the large diameter of the cone and the small end of the cone is closed by sewing the fabric sides together. A wire cage 80 formed in the shape of a cone is secured at one end to a ring 82 and at the other end to a flange ring 84 having a perforated center section 86 for giving added support to the nylon fabric cone. Ring 82 is secured in the inlet 58 of the casing 54 and has a projection 88 thereon for locating ring 78 and positioning the nylon cone. While applicant has found that a porous loosely woven highly napped fabric made from staple yarn of a nonwater absorbing material such as nylon is entirely satisfactory, it should be understood that other materials or fabrics having similar properties of converting water droplets of a very small size on the order of .5 micron to droplets of a larger size on the order of 20 to 30 microns with a minimum pressure drop may be used. The material selected by applicant for explaining this invention has been found to afford a high efficiency of coalescence with a minimum pressure drop and the cone shaped configurations provide a large area subject to air passage.

The collector 70 is formed of a knitted wire mesh fabric of a corrosion resistant material such as aluminum or stainless steel wire 71. The fabric is knit in the form of a tube which is then flattened and diagonally corrugated and is then folded upon itself or is cut into the desired lengths and stacked to form an elongated package several layers thick. A fabric having about a quarter-inch mesh formed with about a ten thousandths wire has been found satisfactory.

The series of turning vanes 68 are arranged so that their ends lie in a plane at an angle of approximately 30° to the horizontal and the pad of wire mesh material forming the collector is supported on the ends of the turning vanes. A series of small rods 90 welded to the sides of the casing 54 serve to hold the pad of wire mesh layer down against the top of the turning vanes. The casing 54 is attached to the casing 56 and inlet 60 by means of a clamping ring, not shown, surrounding the flange 92. The casing 56 is formed as a tube with both ends open. The turning vanes are assembled in the tube, and the metal fabric pads of the collector are assembled on the turning vanes. The ends of the casing 56 are then inserted in place and welded to the tubular casing.

The angle at which the collector pads are arranged and the thickness of the pads are selected for maximum water collection, with a minimum pressure drop and for a minimum weight and space requirement. It has been found that pads of about four inch thickness arranged at an angle of 30° with the horizontal do provide satisfactory results, but it should be understood that the pads can be arranged at a different angle and made thicker or of a different size without departing from the spirit of the present invention. It is believed, however, that permissible pressure drops and efficient water separation will dictate angles of less than 45° with the horizontal. Thinner collectors and steeper angles increase the possibility of the water being carried completely through the collector and then being carried along with the air into the cabin.

It has been found necessary to utilize a coalescer to increase the size of the drops before the drops are fed to the collector because the smaller droplets will not be collected by the collector but will merely blow through, remaining in the air stream. It is therefore necessary to first coalesce the small droplets to provide larger drops and then feed the larger drops to the collector which is wetted by the drops and will collect and precipitate the larger drops. The collected drops will run down the wire mesh and drop across the air stream or run down the sides of the casing 56 where they are collected and drained through the outlet 72.

It is to be understood that the invention is not limited to the specific embodiment herein illustrated and described, and may be used in other ways without departure from its spirit as defined by the following claims.

We claim:

1. In combination, in an air and liquid separator, a horizontal air duct, a coalescer comprising a hollow cone formed of a single porous layer of woven napped nylon cloth arranged across said duct and having the open base of said hollow cone facing upstream, an upwardly directed duct having a larger cross-section than said horizontal duct and receiving air from said horizontal duct, turning vanes in said larger duct downstream of said porous cloth directing air and entrained liquid upwardly toward a collector in said upwardly directed duct, said collector comprising multiple layers of a more open mesh corrugated metallic fabric arranged across said upwardly directed duct and forming an angle of less than 45° with the horizontal.

2. In combination, in an air and liquid separator, an air duct, a coalescer arranged across said duct and comprising a cone shaped hollow support formed of open mesh wire with the open base facing upstream and with a layer of porous woven napped nylon cloth formed as a hollow cone and telescoped inside the wire mesh cone, a collector comprising a thicker layer of a more open mesh fabric arranged across said duct and spaced downstream from said coalescer.

3. In combination, in an air and liquid separator, an air duct having a horizontal entrance, a coalescer comprising a layer of porous woven napped cloth of a staple yarn of non-absorbent material arranged across said duct, turning vanes downstream of the porous cloth directing air upwardly, an upwardly directed duct receiving air from said vanes, a collector comprising a thicker layer built up of multiple layers of a more open mesh fabric, said collector arranged in and across said upwardly directed duct.

4. A device as claimed in claim 3 in which the collector layers are arranged in planes less than 45° to the horizontal.

5. A device as claimed in claim 3 in which the cloth is a single layer of napped nylon formed as a hollow cone with the open base facing upstream and the multiple layers are corrugated metallic fabric with the corrugations of adjacent layers arranged at an angle to each other.

6. In combination, in an air and liquid separator for an aircraft air conditioning system, an air duct, a coalescer comprising a layer of porous woven napped nylon fabric arranged across said duct, and a collector comprising a layer of a more open mesh fabric arranged across said duct and spaced downstream from said coalescer.

References Cited in the file of this patent

UNITED STATES PATENTS

| | | |
|---|---|---|
| 1,535,819 | Emmet | Apr. 28, 1925 |
| 1,544,950 | Smith | July 7, 1925 |
| 1,702,804 | Winslow | Feb. 19, 1929 |
| 2,327,184 | Goodloe | Aug. 17, 1943 |
| 2,331,787 | Lincoln | Oct. 12, 1943 |
| 2,521,785 | Goodloe | Sept. 12, 1950 |
| 2,556,295 | Pace | June 12, 1951 |
| 2,661,076 | Walker | Dec. 1, 1953 |
| 2,745,513 | Massey | May 15, 1956 |